United States Patent
Johansson et al.

(10) Patent No.: US 9,108,639 B2
(45) Date of Patent: Aug. 18, 2015

(54) METHOD AND MODULE FOR CONTROLLING A VEHICLE'S SPEED BASED ON RULES AND/OR COSTS

(75) Inventors: Oskar Johansson, Stockholm (SE);
Maria Södergren, Segeltorp (SE);
Fredrik Roos, Segeltorp (SE)

(73) Assignee: SCANIA CV AB (SE)

( * ) Notice: Subject to any disclaimer, the term of this patent is extended or adjusted under 35 U.S.C. 154(b) by 0 days.

(21) Appl. No.: 14/367,465

(22) PCT Filed: Dec. 22, 2011

(86) PCT No.: PCT/SE2011/051567
§ 371 (c)(1),
(2), (4) Date: Jun. 20, 2014

(87) PCT Pub. No.: WO2013/095232
PCT Pub. Date: Jun. 27, 2013

(65) Prior Publication Data
US 2014/0350821 A1 Nov. 27, 2014

(30) Foreign Application Priority Data

Dec. 22, 2011 (SE) .................... 1151246

(51) Int. Cl.
*B60W 30/14* (2006.01)
*B60W 50/00* (2006.01)

(52) U.S. Cl.
CPC ......... *B60W 30/143* (2013.01); *B60W 50/0097* (2013.01); *B60K 2310/244* (2013.01); *B60W 2710/0666* (2013.01); *B60W 2720/10* (2013.01); *Y02T 10/52* (2013.01); *Y02T 10/84* (2013.01)

(58) Field of Classification Search
CPC .......... B60W 30/143; B60W 50/0097; B60W 2710/0666; B60W 2720/10; Y02T 10/52; Y02T 10/84
USPC .......................................................... 701/93
See application file for complete search history.

(56) References Cited

U.S. PATENT DOCUMENTS

| 6,990,401 B2 * | 1/2006 | Neiss et al. ........... 701/96 |
| 2004/0068359 A1 | 4/2004 | Neiss et al. ........... 711/96 |

(Continued)

FOREIGN PATENT DOCUMENTS

| DE | 10 2009 030 784 A1 | 2/2010 |
| DE | 10 2008 035 944 A1 | 4/2010 |

(Continued)

OTHER PUBLICATIONS

International Search Report mailed Sep. 11, 2012 in corresponding PCT International Application No. PCT/SE2011/051585.

(Continued)

*Primary Examiner* — Mary Cheung
*Assistant Examiner* — Anne Mazzara
(74) *Attorney, Agent, or Firm* — Ostrolenk Faber LLP

(57) ABSTRACT

A method for determination of at least one reference value for controlling a vehicle's speed is described. The method may entail making a first prediction $v_{pred\_Tnew\_ret}$ and a second prediction $v_{pred\_Tnew\_acc}$ of a vehicle speed along a horizon, said first prediction based on an engine torque $T_{ret}$ which retards the vehicle as compared with a conventional cruise control, and said second prediction based on an engine torque $T_{acc}$ which accelerates the vehicle as compared with a conventional cruise control; comparing said respective first prediction $v_{pred\_Tnew\_ret}$ and second prediction $v_{pred\_Tnew\_acc}$ of the vehicle speed with a lower limit value $v_{min}$ and/or an upper limit value $v_{max}$ which delineate a range within which the vehicle's speed should be; and determining at least one reference value based on at least one of said respective comparisons and said first prediction $v_{pred\_Tnew\_ret}$ and second prediction $v_{pred\_Tnew\_acc}$ of the vehicle speed along the horizon.

34 Claims, 6 Drawing Sheets

(56) References Cited

U.S. PATENT DOCUMENTS

2007/0265759 A1 11/2007 Salinas et al. .................. 701/93
2010/0049400 A1 2/2010 Duraiswamy et al. .......... 701/35

FOREIGN PATENT DOCUMENTS

DE 10 2010 003 428 A1 10/2011
WO WO 2010/144028 A1 12/2010

OTHER PUBLICATIONS

Erik Hellström et al., "Look-ahead control for heavy trucks to minimize trip time and fuel consumption," Control Engineering Practice, 17(2):245-254, 2009.

Sangiun Park et al., "Predictive Eco-Cruise Control: Algorithm and Potential Benefits," 2011 IEEE Forum on Integrated and Sustainable Transportation Systems (FISTS), pp. 394-399, Vienna, Austria, Jun. 29-Jul. 1, 2011.

Erik Hellström, "Explicit use of road topography for model predictive cruise control in heavy trucks," Master's thesis performed in Vehicular Systems, ISRN: LiTH-ISY-EX—05/3660—SE, Linköping, Feb. 21, 2005.

Maria Ivarsson, "Fuel Optimal Powertrain Control for Heavy Trucks Utilizing Look Ahead," Linköping Studies in Science and Technology Thesis No. 1400, ISBN 978-91-7393-637-8, SE, Linköping, 2009.

* cited by examiner

METHOD AND MODULE FOR CONTROLLING A VEHICLE'S SPEED BASED ON RULES AND/OR COSTS

CROSS-REFERENCE TO RELATED APPLICATIONS

The present application is a 35 U.S.C. §§371 national phase conversion of PCT/SE2011/051567, filed Dec. 22, 2011, which claims priority of Swedish Application No. 1151246-4, filed Dec. 22, 2011. The contents of both applications are incorporated by reference herein. The PCT International Application was published in the English language.

FIELD OF THE INVENTION

The present invention relates to a method and a module for determining at least one reference value which indicates how a vehicle's speed is to be influenced and which can be used to control at least one control system of the vehicle, according to the present disclosure.

BACKGROUND TO THE INVENTION

Cruise control is now usual in motor vehicles, e.g. cars, trucks and buses. An object of cruise control is to achieve a uniform predetermined speed. This is done either by adjusting the engine torque to avoid retardation, or by applying braking action on downhill runs where the vehicle is accelerated by its own weight. A more general object of cruise control is to provide convenient driving and better comfort for the vehicle's driver. A driver of a vehicle equipped with cruise control usually chooses a set speed $v_{set}$ as the speed he/she wishes the vehicle to maintain on level roads. A cruise control then supplies an engine system of the vehicle with a reference speed $v_{ref}$ used for control of the engine. The set speed $v_{set}$ may thus be regarded as an input signal to the cruise control, whereas the reference speed $v_{ref}$ may be regarded as an output signal from the cruise control and is used for control of the engine.

Today's traditional cruise control (CC) maintains a constant reference speed $v_{ref}$ usually set by the vehicle's driver in the form of a set speed $v_{set}$ which is thus here a desired speed chosen for example by him/her, and for today's conventional cruise controls the reference speed is constant and equal to the set speed, i.e. $v_{ref}=v_{set}$. The value of the reference speed $v_{ref}$ changes only when adjusted by the driver while the vehicle is in motion. The reference speed $v_{ref}$ is then sent to a control system which controls the vehicle so that its speed corresponds when possible to the reference speed $v_{ref}$. If the vehicle is equipped with an automatic gearchange system, the gears may be changed by that system on the basis of the reference speed $v_{ref}$ to enable the vehicle to maintain the reference speed $v_{ref}$, i.e. to enable it to maintain the desired set speed $v_{set}$.

In hilly terrain, the cruise control system will try to maintain the set speed vset uphill and downhill. This may result inter alia in the vehicle accelerating over the crest of a hill and into a subsequent downgrade. It will then need to be braked to avoid exceeding the set speed $v_{set}$ or will reach a speed $V_{kfb}$ at which the constant speed brake is activated, which is a fuel-expensive way of driving the vehicle. It may also need to be braked downhill to avoid exceeding the set speed $v_{set}$ or the constant speed brake's activation speed $v_{kfb}$ in cases where the vehicle does not accelerate over the crest of the hill.

To reduce fuel consumption, especially on hilly roads, economical cruise controls such as Scania's Ecocruise® have been developed. This cruise control tries to estimate the vehicle's current running resistance and also has information about its historical running resistance. The economical cruise control may also be provided with map data comprising topographical information. The vehicle is then located on the map, e.g. by means of GPS, and the running resistance along the road ahead is estimated. The vehicle's reference speed $v_{ref}$ can thus be optimised for different types of roads in order to save fuel, in which case the reference speed $v_{ref}$ may differ from the set speed $v_{set}$. This specification refers to cruise controls which allow the reference speed $v_{ref}$ to differ from the set speed $v_{set}$ chosen by the driver, i.e. reference speed-regulating cruise controls.

An example of a further development of an economical cruise control is a "look ahead" cruise control (LACC), a strategic form of cruise control which uses knowledge of sections of road ahead, i.e. knowledge of the nature of the road ahead, to determine the reference speed $v_{ref}$. LACC is thus an example of a reference speed-regulating cruise control whereby the reference speed $v_{ref}$ is allowed, within a certain range $[v_{min}, v_{max}]$, to differ from the set speed $v_{set}$ chosen by the driver, in order to achieve more fuel saving.

Knowledge of the road section ahead may for example comprise information about prevailing topology, road curvature, traffic situation, roadworks, traffic density and state of road. It may further comprise a speed limit on the section ahead, and a traffic sign beside the road. Such knowledge is for example available from location information, e.g. GPS (global positioning system) information, map information and/or topographical map information, weather reports, information communicated between vehicles and information provided by radio. All this knowledge may be used in a variety of ways. For example, information about a speed limit on the road ahead may be used to achieve fuel efficiency by lowering the vehicle's speed before reaching a lower speed limit. Similarly, knowledge of a road sign which indicates for example a roundabout or intersection ahead may also be used to achieve fuel efficiency by braking before the vehicle reaches the roundabout or intersection.

An LACC cruise control does for example make it possible, before a steep upgrade, for the reference speed $v_{ref}$ to be raised to a level above the set speed $v_{set}$, since the vehicle will be expected to lose speed on such a climb owing to high train weight relative to engine performance. Similarly, before a steep downgrade, the LACC cruise control makes it possible for the reference speed $v_{ref}$ to be lowered to a level below the set speed $v_{set}$, since the vehicle will be expected to accelerate on such a downgrade owing to its high train weight. The concept here is that reducing the speed at which the vehicle begins the downhill run makes it possible to reduce the energy braked away and/or the air resistance losses (as reflected in the amount of fuel injected before the downgrade). The LACC cruise control may thus reduce fuel consumption without substantially affecting journey time.

An example of a previously known cruise control which uses topographical information is described in the document entitled "Explicit use of road topography for model predictive cruise control in heavy trucks" by Erik Hellström, ISRN: LiTH-ISY-EX-05/3660-SE. Cruise control is here effected by real-time optimisation, and a cost function is used to define the optimisation criteria. A large number of different solutions are here calculated and evaluated, and the solution resulting in lowest cost is applied. As a considerable amount of calculations is involved, the processor which is to perform them needs a large capacity.

Other known solutions for cruise control have reduced the number of possible solutions by opting instead to iterate from one solution along the vehicle's intended route. However, the topography of the itinerary and the vehicle's weight and engine performance may lead to various heavy demands in terms of processor load for determining the reference speed $v_{ref}$. More calculations are needed when, for example, a heavily laden truck with medium-high power output travels on a hilly road as compared with a lightly laden truck with a higher power output travelling on a relatively level road. The reason is that the truck in the first case is likely to accelerate on each downgrade and decelerate on each upgrade, whereas in the second case the truck will find the road substantially level.

The built-in system's processor will thus be subject to relatively large demands if the previously known solutions are applied, since the processor load may vary greatly in different circumstances. For example, the capacity of the processor needs to be sufficient to deal quickly with cases where a large number of calculations have to be done in a limited time. The processor has therefore to be dimensioned to cater for such cases despite the fact that they arise during only a limited portion of the processor time used.

SUMMARY OF THE DISCLOSURE

An object of the present invention is to propose an improved system for controlling a vehicle's speed so that the amount of fuel used can be minimised and, in particular, for controlling the vehicle's speed in such a way that the processor load will be smaller and more uniform over time. A further object of the invention is to propose a simplified cruise control which behaves more predictably than previous known economical and/or reference speed-regulating cruise controls.

According to an aspect of the present invention, at least one of the objects described above is achieved by applying the aforesaid method for controlling a vehicle's speed, which method is characterised by:

making a first prediction $v_{pred\_Tnew\_ret}$ and a second prediction $v_{pred\_Tnew\_acc}$ of a vehicle speed along a horizon, said first prediction based on an engine torque $T_{ret}$ which retards the vehicle as compared with a conventional cruise control, and said second prediction based on an engine torque $T_{acc}$ which accelerates the vehicle as compared with a conventional cruise control;

comparing said respective first prediction $v_{pred\_Tnew\_ret}$ and second prediction $v_{pred\_Tnew\_acc}$ of the vehicle speed with a lower limit value $v_{min}$ and/or an upper limit value $v_{max}$ which delineate a range within which the vehicle's speed should be; and determining at least one reference value based on at least one of said respective comparisons and said first prediction $V_{pred\_Tnew\_ret}$ and second prediction $v_{pred\_Tnew\_acc}$ of the vehicle speed along the horizon.

According to an aspect of the present invention, at least one of the objects described above is achieved by using the aforesaid module to control a vehicle's speed, which module is characterised by:

making a first prediction $v_{pred\_Tnew\_ret}$ and a second prediction $v_{pred\_Tnew\_acc}$ of a vehicle speed along a horizon, said first prediction based on an engine torque $T_{ret}$ which retards the vehicle as compared with a conventional cruise control, and said second prediction based on an engine torque $T_{acc}$ which accelerates the vehicle as compared with a conventional cruise control;

comparing said respective first prediction $v_{pred\_Tnew\_ret}$ and second prediction $v_{pred\_Tnew\_acc}$ of the vehicle speed with a lower limit value $v_{min}$ and/or an upper limit value $v_{max}$ which delineate a range within which the vehicle's speed should be; and determining at least one reference value based on at least one of said respective comparisons and said first prediction $v_{pred\_Tnew\_ret}$ and second prediction $v_{pred\_Tnew\_acc}$ of the vehicle speed along the horizon.

The determination of the at least one reference value and the consequent control of the vehicle's speed by applying the method described above and/or using the module described above result in a substantially constant processor load, since similar numbers of predictions are made during each simulation cycle at a constant rate f. According to the present invention, the processor load is independent of the vehicle's power output and weight and the nature of the road's topography. The processor which is to perform the calculations knows here how much processor power will be needed over time, which makes it very easy to allocate sufficient processor power over time. The processor load will thus here be substantially similar in different situations with different topography and also be independent of the vehicle's engine torque. This means that the processor which is to perform the calculations can be dimensioned without having to cater for peaks associated with worst possible situations. The processor can instead be dimensioned to cater for a uniform processor load. The processor cost can thus be reduced, leading also to lower production costs for the vehicle.

Only vehicle speed variations ahead along the horizon are predicted, rendering the processor load relatively small. The reference value to be used for regulating the vehicle's speed is then chosen on the basis of the result of at least one of said respective comparisons of said first prediction $v_{pred\_Tnew\_ret}$ and second prediction $v_{pred\_Tnew\_acc}$ of the vehicle speed with a lower limit value $v_{min}$ and/or an upper limit value $v_{max}$ and said first prediction $v_{pred\_Tnew\_ret}$ and second prediction $v_{pred\_Tnew\_acc}$ of the vehicle speed along the horizon.

By predicting the vehicle's speed at different torques T, viz. at a torque $T_{ret}$ which retards the vehicle as compared with a conventional cruise control and a torque $T_{acc}$ which accelerates the vehicle as compared with a conventional cruise control, the system can evaluate the reference value to be used in regulating the vehicle's speed.

According to an embodiment of the invention, the reference value on which the vehicle speed is to be regulated is based on at least one rule. This rule or rules thus define how to choose the reference value.

According to an embodiment of the present invention, at least one of these rules is that the reference value on which the vehicle speed is to be regulated is a value corresponding to the set speed $v_{set}$ if said first prediction $v_{pred\_Tnew\_ret}$ of the vehicle speed is below the lower limit value $v_{min}$ and at the same time said second prediction $v_{pred\_Tnew\_acc}$ of the vehicle speed is above the upper limit value $v_{max}$.

According to an embodiment of the present invention, at least one of these rules is that the at least one reference value is a value which represents said first predicted vehicle speed $v_{pred\_Tnew\_ret}$ if a minimum value for said first predicted speed is equal to or above the lower limit value $v_{min}$ and if also a maximum value for said first predicted speed is equal to or above a further upper limit value $v_{max2}$ which is related to a set speed $v_{set}$. According to an embodiment, the further upper limit value $v_{max2}$ corresponds to the set speed plus a constant $c_1$, i.e. $v_{max2}=v_{set}+c_1$. According to another embodiment, the further upper limit value $v_{max2}$ corresponds to a factor $c_1$ multiplied by the set speed, i.e. $v_{max2}=v_{set}*c_1$. This factor $c_1$ may for example have the value 1.02, meaning that the further upper limit value $v_{max2}$ is 2% higher than the set speed $v_{set}$.

According to an embodiment of the present invention, at least one of these rules is that the at least one reference value is a value which represents said second predicted vehicle speed $v_{pred\_Tnew\_acc}$ if a maximum value for said second predicted speed is equal to or below the upper limit value $v_{max}$ and if also a minimum value for said second predicted speed is equal to or below a further lower limit value $v_{min2}$ which is related to a set speed. According to an embodiment, the further lower limit value $V_{min2}$ corresponds to the set speed $v_{set}$ minus a constant $c_2$, i.e. $v_{min2} = v_{set} - c_2$. According to another embodiment, the further lower limit value $v_{min2}$ corresponds to a factor $c_2$ multiplied by the set speed, i.e. $v_{min2} = v_{set} * c_2$. This factor $c_2$ may for example have the value 0.98, meaning that the further upper limit value $v_{max2}$ is 2% lower than the set speed $v_{set}$.

According to an embodiment of the invention, the simulations done according to the method for the invention by use of cost functions are evaluated. This involves calculating the cost of at least one of the said first prediction $v_{pred\_Tnew\_ret}$, said second prediction $v_{pred\_Tnew\_acc}$ and a further first prediction $v_{pred\_Tk+new\_acc}$ and a further second prediction $v_{pred\_Tk+new\_acc}$ of the vehicle speed by using at least one cost function $J_{Tnew\_ret}$, $J_{Tnew\_acc}$, $J_{TK+new\_ret}$, $T_{Tk\_new\_acc}$.

According to an embodiment of the invention, a penalty may be added to at least one of the cost functions $J_{Tnew\_ret}$, $J_{Tk+new\_ret}$ for said first prediction $v_{pred\_Tnew\_ret}$ and said second first prediction $v_{pred\_Tk+new\_ret}$ of the vehicle speed if said first and said further first predictions reach different final speeds.

Similarly, according to an embodiment of the invention, a penalty is added to at least one of the cost functions $J_{Tnew\_acc}$ and $T_{Tk\_new\_acc}$ for said second prediction $v_{pred\_Tnew\_acc}$ and said further second prediction $v_{pred\_Tk+new\_acc}$ of the vehicle speed if said second and said further second predictions reach different final speeds.

Preferred embodiments of the invention are described herein.

BRIEF DESCRIPTION OF THE ATTACHED DRAWINGS

The invention is described below with reference to the attached drawings, in which.

DETAILED DESCRIPTION OF PREFERRED EMBODIMENTS OF THE INVENTION

Figure 1:
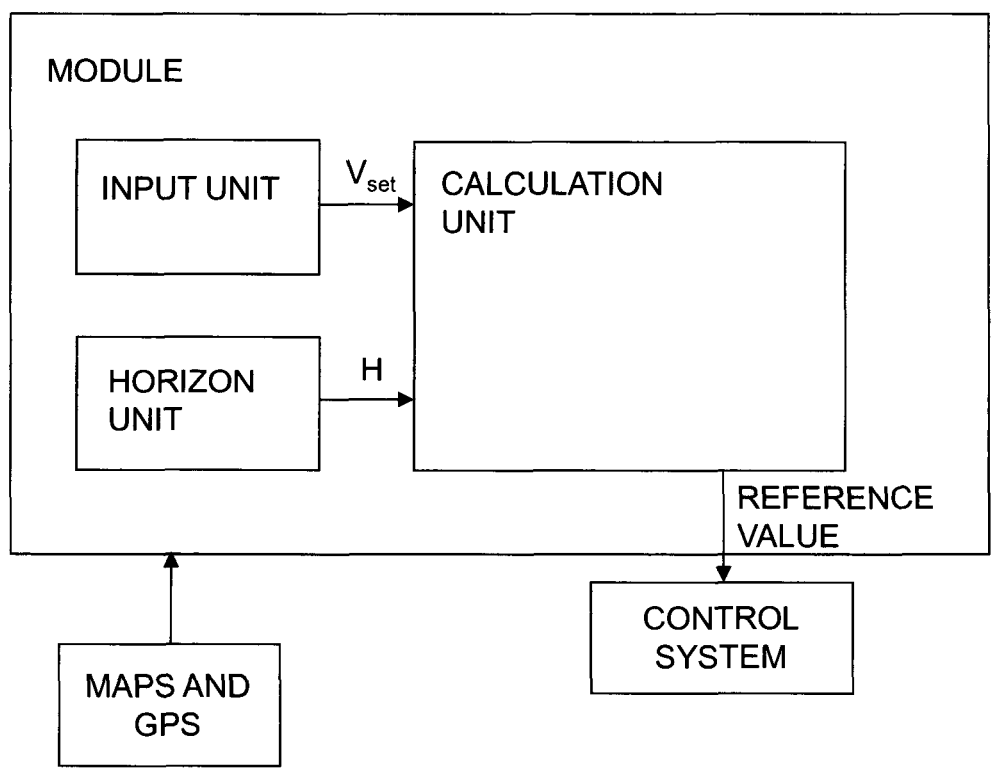
FIG. 1 depicts a module according to an embodiment of the invention.

FIG. 1 depicts a module for controlling a vehicle's speed according to an aspect of the invention. The module comprises an input unit adapted to receiving a desired speed, i.e. a set speed $v_{set}$, for the vehicle. The driver may for example set a speed $v_{set}$ which he/she wishes the vehicle to maintain. The module comprises also a horizon unit adapted to determining a horizon H for the itinerary by means of map data and location data. The horizon H is made up of route segments with at least one characteristic for each segment. A possible example of characteristics of segments is their gradient α, in radians.

The description of the present invention states that GPS (global positioning system) is used to determine location data for the vehicle, but specialists will appreciate that other kinds of global or regional positioning systems are conceivable to provide these data. Such positioning systems might for example use radio receivers to determine the vehicle's location. The vehicle might also use sensors to scan the surroundings and thereby determine its location.

FIG. 1 illustrates how the module is provided with information about the itinerary from maps (map data) and GPS (location data). The itinerary is sent to the module bit by bit, e.g. via CAN (controller area network) bus. The module may be separate from or be part of the one or more control systems which are to use reference values for regulating. An example of such a control system is the vehicle's engine control system. Alternatively, the unit which handles maps and positioning systems may be part of a system which is to use reference values for regulating. In the module, the bits of the itinerary are then put together in a horizon unit to construct a horizon and are processed by the processor unit to create an internal horizon on which the control system can regulate. The horizon is then continually supplemented by new bits of itinerary from the unit with GPS and map data, to maintain a desired length of horizon. The horizon is thus updated continuously when the vehicle is in motion.

CAN is a serial bus system specially developed for use in vehicles. The CAN data bus makes digital data exchange possible between sensors, regulating components, actuators, control devices etc., and provides assurance that two or more control devices can have access to the signals from a given sensor in order to use them to control components connected to them. Each of the connections between the units illustrated in FIG. 1 may take the form of one or more from among a cable, a data bus, e.g. a CAN (controller area network) bus, an MOST (media orientated systems transport) bus, or some other bus configuration, or a wireless connection.

The module comprises also a calculation unit adapted to making a first prediction $v_{pred\_Tnew\_ret}$ and a second prediction $v_{pred\_Tnew\_acc}$ of a vehicle speed along a horizon, said first prediction based on an engine torque $T_{ret}$ which retards the vehicle as compared with a conventional cruise control, and said second prediction based on an engine torque $T_{acc}$ which accelerates the vehicle as compared with a conventional cruise control.

The module is further arranged to compare said respective first prediction $v_{pred\_Tnew\_ret}$ and second prediction $v_{pred\_Tnew\_acc}$ of the vehicle speed with a lower limit value $v_{min}$ and/or an upper limit value $v_{max}$ which delineate a range within which the vehicle's speed should be. The module is further arranged to determine at least one reference value based on at least one of said respective comparisons and said first prediction $v_{pred\_Tnew\_ret}$ and said second prediction $v_{pred\_Tnew\_acc}$ of the vehicle speed along the horizon.

The module is further arranged to supply, e.g. by sending, to a control system of the vehicle said at least one reference value on which the vehicle is then regulated. How the predictions of the speeds are made will be explained in more detail below.

The module and/or the calculation unit comprise at least a processor and a memory unit which are adapted to making all the calculations, predictions and comparisons of the method according to the invention. Processor means here a processor or microcomputer, e.g. a circuit for digital signal processing (digital signal processor, DSP), or a circuit with a predetermined specific function (application integrated specific circuit. ASIC). The calculation unit is connected to a memory unit which provides it with, for example, the stored programme code and/or stored data which the calculation unit needs to enable it to do calculations. The calculation unit is also adapted to storing partial or final results of calculations in the memory unit.

The method for control of vehicle speed according to the present invention and its various embodiments may also be implemented in a computer programme which, when executed in a computer, e.g. the aforesaid processor, causes the computer to apply the method. The computer programme usually takes the form of a computer programme product stored on a digital storage medium, and is contained in a computer programme product's computer-readable medium which comprises a suitable memory, e.g. ROM (read-only memory), PROM (programmable read-only memory), EPROM (erasable PROM), flash memory, EEPROM (electrically erasable PROM), a hard disc unit, etc.

Figure 2:
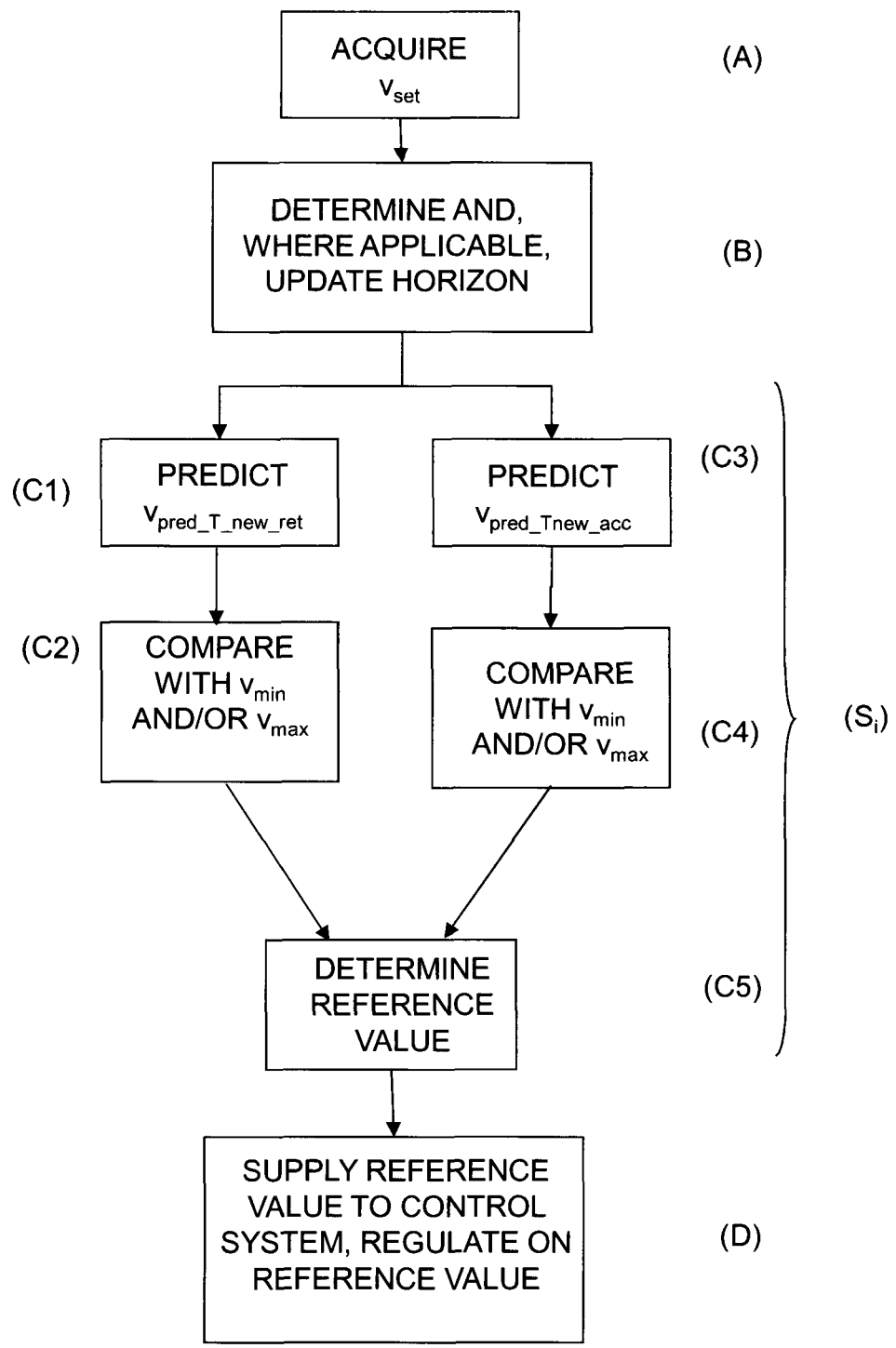
FIG. 2 depicts a flowchart for the method according to an embodiment of the invention.

FIG. 2 is a flowchart for a method which inter alia comprises steps for the method according to the invention. The diagram comprises not only steps for the determination of reference values according to the invention but also steps for controlling the vehicle's speed according to an embodiment of the invention.

The method comprises a first step A) of acquiring $v_{set}$ as a desired set speed for the vehicle to maintain, and a second step B) of determining a horizon for the itinerary by means of map data and location data comprising route segments with at least one characteristic for each segment.

A number of simulation cycles may be done along the length of the horizon. A simulation cycle $s_j$ may comprise a number N of simulation steps which may be conducted at a predetermined rate f. According to the invention, the following steps are performed during such a simulation cycle $s_j$:

C1) Making a first prediction $v_{pred\_Tnew\_ret}$ of a vehicle speed along a horizon on the basis of an engine torque $T_{ret}$ which retards the vehicle as compared with a conventional cruise control.

C2) Comparing said first prediction $v_{pred\_Tnew\_ret}$ of the vehicle speed with a lower limit value $v_{min}$ and/or an upper limit value $v_{max}$ which delineate a range within which the vehicle's speed should be. Said first prediction thus does not have to be compared here both with the lower limit value $v_{min}$ and with the upper limit value $v_{max}$.

C3) Making a second prediction $v_{pred\_Tnew\_acc}$ of a vehicle speed along a horizon on the basis of an engine torque $T_{acc}$ which accelerates the vehicle as compared with a conventional cruise control.

C4) Comparing said second prediction $v_{pred\_Tnew\_acc}$ of the vehicle speed with a lower limit value $v_{min}$ and/or an upper limit value $v_{max}$ which delineate a range within which the vehicle's speed should be. Said second prediction thus does not have to be compared here both with the lower limit value $v_{min}$ and with the upper limit value $v_{max}$.

C5) Determining at least one reference value on the basis of at least one of said respective comparisons and said first prediction $v_{pred\_Tnew\_ret}$ and second prediction $v_{pred\_Tnew\_acc}$ of the vehicle speed along the horizon.

As a further step D) said at least one reference value is then supplied, e.g. by being sent via a CAN bus, to a control system of the vehicle in which it is used to regulate the vehicle's speed according to said at least one reference value.

The method according to the present invention results in a constant and predetermined processor load when determining said at least one reference value.

The set speed $v_{set}$ is thus the driver's input signal related to a desired cruise control speed, and the at least one reference value is the value on which the vehicle is regulated. The at least one reference value is preferably a reference speed $v_{ref}$, a reference torque $T_{ref}$ or a reference engine speed $\omega_{ref}$.

The reference speed $v_{ref}$, which thus constitutes the at least one reference value, is imparted to the speed regulator of the engine control unit. In traditional cruise control, as mentioned above, the reference speed $v_{ref}$ is equal to the set speed, i.e. $v_{ref}=v_{set}$. The speed regulator then controls the vehicle's speed on the basis of the reference speed $v_{ref}$ by demanding necessary torque from the engine's torque regulator. According to the embodiment in which the at least one reference value is a reference torque $T_{ref}$, it may be sent directly to the engine's torque regulator. In the embodiment where the at least one reference value is a reference engine speed $\omega_{ref}$, it may be sent directly to the engine's speed regulator.

There follows a description of how the various predicted speeds are determined.

The total force $F_{env}$ acting upon the vehicle from the environment is made up of rolling resistance $F_{roll}$, gravitation F and air resistance $F_{air}$. Gravitation is calculated as $$F = m \cdot g \cdot \alpha \quad \text{(eq. 1)}$$

where m is the weight of the vehicle and $\alpha$ the gradient of the road in radians. Since mostly only small angles are concerned, $\sin(\alpha)$ is approximated to $\alpha$.

Air resistance is calculated as a factor k multiplied by the square of vehicle speed, as follows:

$$F_{env} = F_{roll,present} + m \cdot 9.82 \cdot \alpha + k \cdot v_{i-1}^2 \quad \text{(eq. 2)}$$

$$F_{roll,present} = F_{roll,est}, \; m = m_{est}, \; k = \frac{1}{2} \rho \cdot C_d \cdot A \quad \text{(eq. 3)}$$

where A is the vehicle's estimated frontal area, $C_d$ the resistance coefficient which depends on the streamline shape of the object, $\rho$ the density of the air and m the weight of the vehicle estimated by its weight estimation system as mest. Current rolling resistance $F_{roll,present}$ is also estimated in the vehicle continuously as $F_{roll,est}$. For calculation of $m_{est}$ and $F_{roll,est}$ please refer to the dissertation entitled "Fuel Optimal Powertrain Control for Heavy Trucks Utilizing Look Ahead" by Maria Ivarsson, Linköping 2009, ISBN 978-91-7393-637-8. $v_{i-1}$ is the vehicle's predicted speed at preceding simulation step.

The force $F_{drive}$ which propels the vehicle forwards depends on which prediction is made. It is taken according to an embodiment as either a torque which accelerates the vehicle or a torque which retards the vehicle as compared with conventional cruise control.

The force $F_{drive}$ which propels the vehicle forwards may be taken as between a maximum possible force (maximum torque) and at least possible force (minimum torque, e.g. drag torque). It is possible, however, as described above, to use substantially any desired force within the range $$F_{min} \leq F_{drive} \leq F_{max} \quad \text{(eq. 4)}$$

and the first prediction $v_{pred\_Tnew\_ret}$ and the second prediction $v_{pred\_Tnew\_acc}$ of the vehicle's speed may therefore be made at torques other than maximum or minimum torque. $F_{max}$ is calculated as a maximum available engine torque, which is described as a function of engine speed, multiplied by the total transmission ratio $i_{tot}$ and divided by the effective tyre radius $r_{wheel}$. The minimum force $F_{min}$ is calculated in a similar way to the maximum force $F_{max}$ but with minimum torque instead:

$$F_{max} = \frac{T_{max}(\omega) \cdot i_{tot}}{r_{wheel}} \quad \text{(eq. 5)}$$

$$F_{min} = \frac{T_{min}(\omega) \cdot i_{tot}}{r_{wheel}} \quad \text{(eq. 6)}$$

where n is the vehicle's engine speed and $i_{tot}$ the vehicle's total transmission ratio.

The vehicle's acceleration Acc is given by $$Acc = (F_{drive} - F_{env})/m \quad \text{(eq. 7)}$$

According to an embodiment, simulation steps C1-C5 during a simulation cycle $s_j$ of N steps have a constant step length which depends on the vehicle's speed. The length dP of each simulation step is given by $$dP = K \cdot v_{init} \quad \text{(eq. 8)}$$

where K is a time constant, e.g. 0.9 s, and $v_{init}$ is prevailing vehicle speed at the beginning of the simulation.

The time dt for a simulation step is given by $$dt = dP/v_{i-1} \quad \text{(eq. 9)}$$

where $v_{i-1}$ is predicted speed at preceding simulation step i-1.

The speed difference dv is $$dv = Acc \cdot dt \quad \text{(eq. 10)}$$

Energy consumed dW for a simulation step is given by $$dW = dP \cdot (F_{drive} - F_{min}) \quad \text{(eq. 11)}$$

The speed $v_i$ at current simulation step becomes $$v_i = v_{i-1} + dv \quad \text{(eq. 12)}$$

Total time $t_i$ for current simulation step is $$t_i = t_{i-1} + dt \quad \text{(eq. 13)}$$

Total energy consumed $W_i$ for current simulation step is $$W_i = W_{i-1} + dW \quad \text{(eq. 14)}$$

Figure 3:
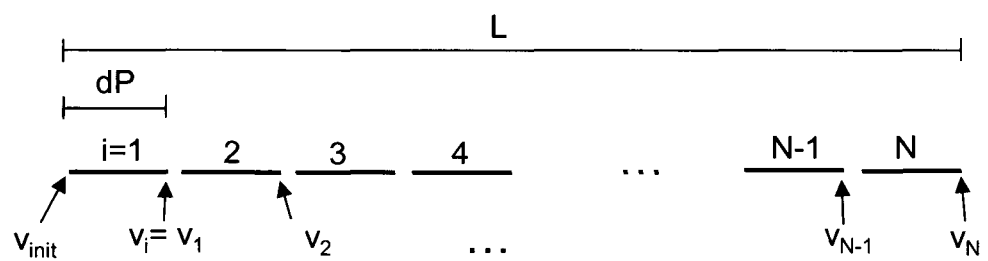
FIG. 3 illustrates a predicted speed during a simulation cycle according to an embodiment of the invention.

FIG. 3 illustrates how a vehicle speed is predicted during a simulation cycle $s_j$ of N simulation steps with a horizon which is L meters long. The prediction is discontinued after N simulation steps, i.e. after a simulation cycle $s_j$. A fresh simulation cycle $s_{j+1}$ then begins in the next time sample. Each simulation cycle $s_j$ has a predetermined frequency f. At a frequency of 100 Hz, for example, 100 simulation steps are conducted per second. As the length of each simulation step depends on the vehicle's speed $v_{init}$ at the beginning of the prediction, the length of the predicted section of the horizon varies with the vehicle's speed.

For example, at 80 km/h (22.22 m/s) the horizon becomes 2 km long if f=100 Hz and K=0.9 s, since each simulation step dP then becomes 20 m long and over 100 steps the horizon then becomes 2 km. FIG. 3 shows a fresh speed $v_i$ predicted at each simulation step i. The processor load here becomes constant and the number of simulation steps i decides how long a simulation cycle $s_j$ will taken. The number of simulation steps is determined by the rate f, which according to an embodiment is a predetermined value. The maximum processor load can therefore always be determined in advance, which is advantageous in that the processor load can be dimensioned accordingly. The processor load is therefore independent of road topography, vehicle weight and engine type. According to an embodiment, the first prediction $v_{pred\_Tnew\_ret}$ and the second prediction $v_{pred\_Tnew\_acc}$ of the vehicle speed may be vectors with N values each, or alternatively only maximum and minimum values for the first prediction $v_{pred\_Tnew\_ret}$ and second prediction $v_{pred\_Tnew\_acc}$ may be saved in each simulation cycle $s_j$.

The one or more reference values which the vehicle's control system is to aim at are determined continuously when the vehicle is in motion. They are preferably determined as from a certain predetermined distance ahead of the vehicle and are then synchronised in the control unit so that the calculated reference value for a given situation is set at the right time. An example of such a distance is 50 meters, which the control unit therefore caters for in regulating the vehicle.

An embodiment according the invention will now be explained with reference to the flowchart in FIG. 4.

Figure 4:
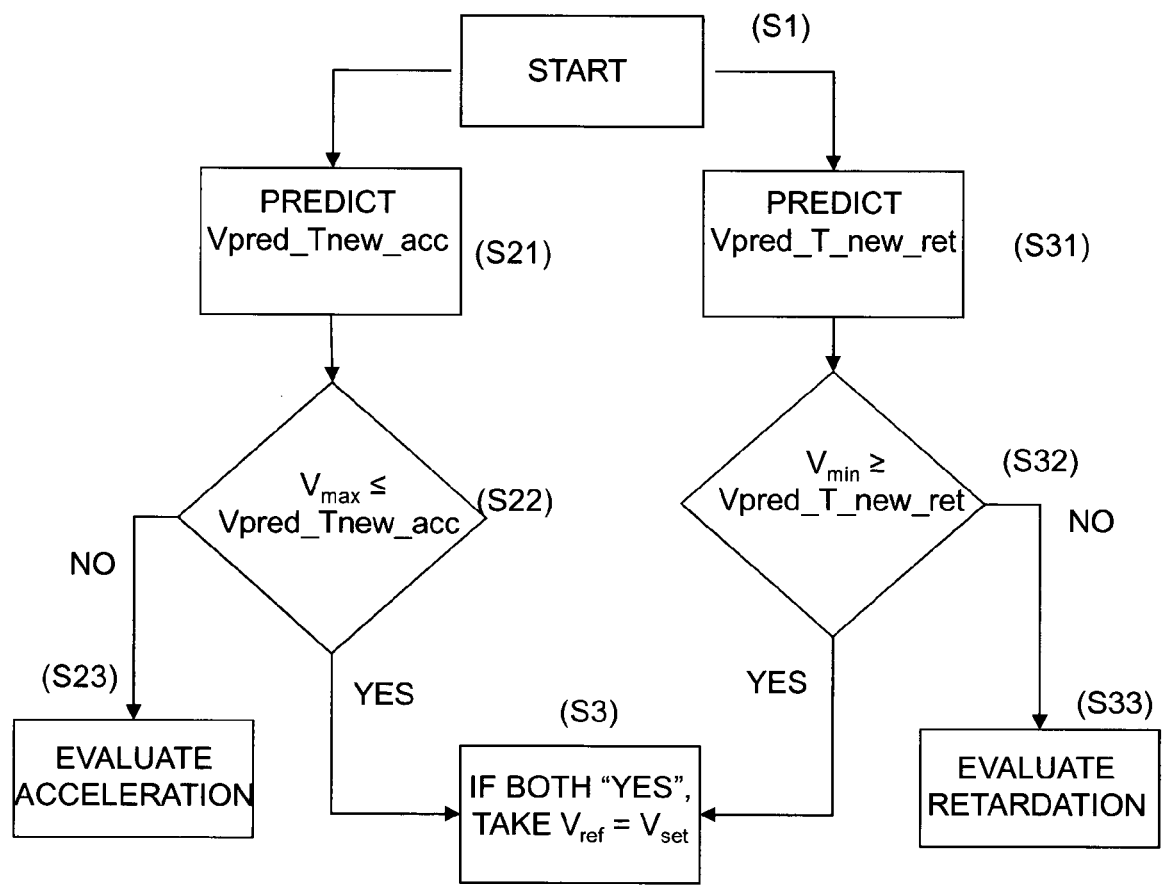
FIG. 4 illustrates a flowchart for the method according to an embodiment of the invention.

The flowchart in FIG. 4 illustrates how at the least one reference value is determined according to an embodiment of the invention. It shows the method starting at step S1. This is followed at steps 21 and 31 respectively by a first prediction $v_{pred\_Tnew\_ret}$ and a second prediction $v_{pred\_Tnew\_acc}$ of vehicle speed along the horizon, said first prediction based on an engine torque $T_{ret}$ which retards the vehicle as compared with a conventional cruise control, and said second prediction based on an engine torque $T_{acc}$ which accelerates the vehicle as compared with a conventional cruise control.

According to an embodiment of the invention, said first prediction $v_{pred\_Tnew\_ret}$ and second prediction $v_{pred\_Tnew\_acc}$ of a vehicle speed along the horizon are made in parallel, i.e. at substantially the same time in different branches of the flowchart for the method as illustrated in FIG. 4. According to another embodiment of the invention, said first prediction $v_{pred\_Tnew\_ret}$ and second prediction $v_{pred\_Tnew\_acc}$ of a vehicle speed along the horizon are made sequentially, i.e. one after another.

This is followed by the respective steps S22 and S32 of comparing said respective first prediction $v_{pred\_Tnew\_ret}$ and second prediction $v_{pred\_Tnew\_acc}$ of the vehicle speed with a lower value $v_{min}$ and/or an upper limit value $v_{max}$ which delineate a range within which the vehicle's speed should be.

According to an embodiment, the respective comparisons of said first prediction $v_{pred\_Tnew\_ret}$ and second prediction $v_{pred\_Tnew\_acc}$ of the vehicle speed with a lower limit value $v_{min}$ and/or an upper limit value $v_{max}$ take place substantially in parallel at the respective steps S22 and S32, as depicted in FIG. 4. According to another embodiment, the comparisons of said first prediction $v_{pred\_Tnew\_ret}$ and second prediction $v_{pred\_Tnew\_acc}$ of the vehicle speed with a lower limit value $v_{min}$ and/or an upper limit value $v_{max}$ take place sequentially.

According to an embodiment of the invention, rules are applied for determining which at least one reference value the vehicle is to be regulated on. A set of rules is therefore used here to determine the value of the at least one reference value.

According to an embodiment, such a rule is that the at least one reference value, which here is the reference speed $v_{ref}$, is determined to a value which represents the set speed $v_{set}$, if at the same time said first prediction $v_{pred\_Tnew\_ret}$ of the vehicle speed is below the lower limit value $v_{min}$ and said second prediction $v_{pred\_Tnew\_acc}$ of the vehicle speed is above the upper limit value $v_{max}$. This is illustrated at step S3 in FIG. 4, which the method moves on to if the result of both the S22 and the S32 comparisons is "YES".

If on the contrary said first prediction $v_{pred\_Tnew\_ret}$ of the vehicle speed is not below the lower limit value $v_{min}$, the method moves on to step S33, in which the retardation (the lowering of the speed) is evaluated.

At step S33, according to an embodiment, the reference speed $v_{ref}$ is determined to a value which represents said first predicted vehicle speed $v_{pred\_Tnew\_ret}$ if a minimum value for said first predicted speed is equal to or above the lower limit value $v_{min}$ and if also a maximum value for said first predicted speed is equal to or above a further upper limit value $v_{max2}$ which is related to a set speed $v_{set}$. According to an embodiment, the further upper limit value $v_{max2}$ corresponds to the set speed plus a constant $c_1$, i.e. $v_{max2}=v_{set}+c_1$. According to another embodiment, the further upper limit value $v_{max2}$ corresponds to a factor $c_1$ multiplied by the set speed $v_{set}$, i.e. $v_{max2}=v_{set}*c_1$. This factor $c_1$ may for example have the value 1.02, meaning that the further upper limit value $v_{max2}$ is 2% higher than the set speed $v_{set}$.

At step S33, according to an embodiment, the reference speed $v_{ref}$ is determined to a value which corresponds to the set speed $v_{set}$ if said first predicted vehicle speed $v_{pred\_Tnew\_ret}$ is below the lower limit value $v_{min}$ and/or below the further upper limit value $v_{max2}$.

Figure 6:
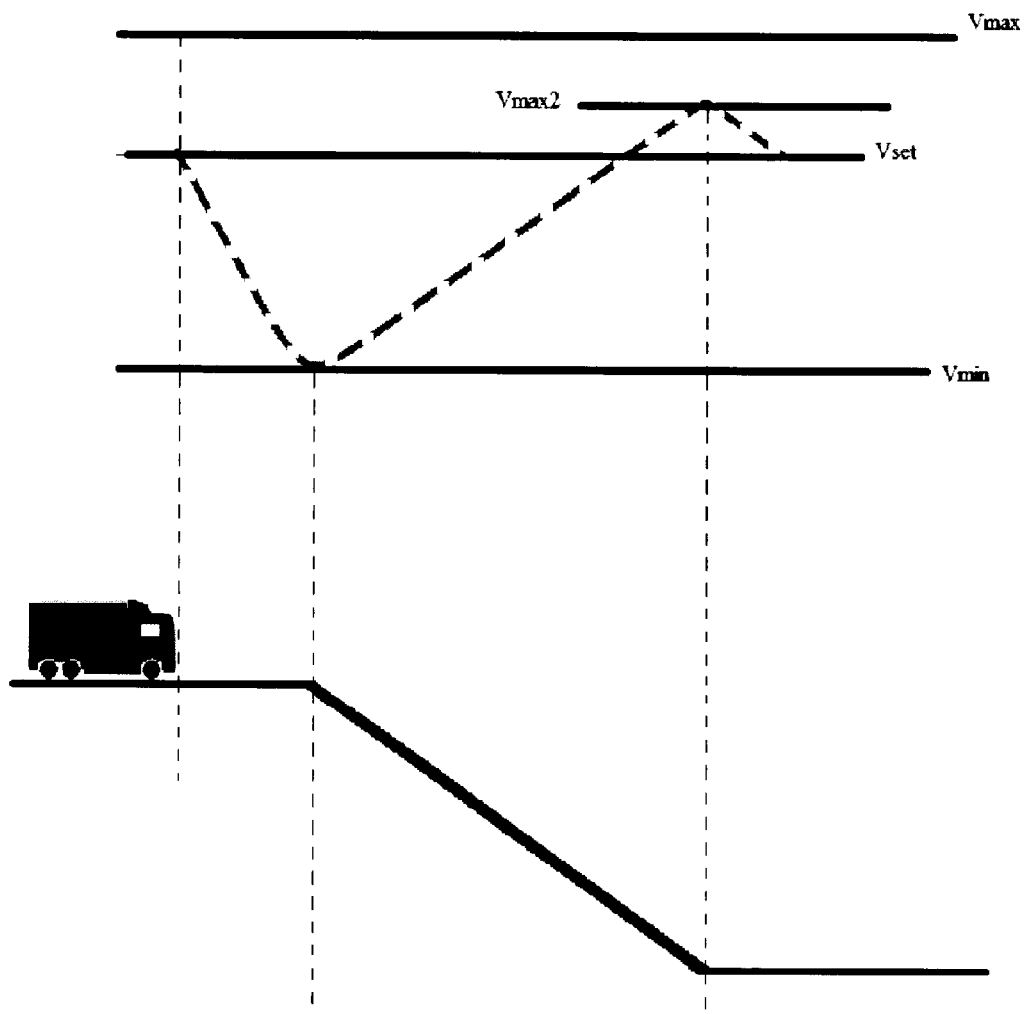
FIG. 6 illustrates the vehicle's predicted speeds according to an embodiment of the invention.

At step S33, according to an embodiment, the reference speed $v_{ref}$ is determined to a value which corresponds to the lower limit value $v_{min}$ if a smallest value for said first predicted vehicle speed $v_{pred\_Tnew\_ret}$ is above or equal to the lower limit value $v_{min}$ and if a largest value for said first predicted speed is above or equal to the further upper limit value $v_{max2}$. This is illustrated schematically in FIG. 6.

If on the contrary said second prediction $v_{pred\_Tnew\_acc}$ of the vehicle speed is not below the lower limit value $v_{min}$, the method moves on to step S23, in which the acceleration (the raising of the speed) is evaluated.

At step S23, according to an embodiment, the reference speed $v_{ref}$ is determined to a value which represents said second predicted vehicle speed $v_{pred\_Tnew\_acc}$ if a maximum value for said second predicted speed is equal to or below the upper limit value $v_{max}$ and if also a minimum value for said second predicted speed is equal to or below a further lower limit value $v_{min2}$ which is related to a set speed. According to an embodiment, the further lower limit value $v_{min2}$ corresponds to the set speed $v_{set}$ minus a constant $c_2$, i.e. $v_{min2}=v_{set}-c_2$. According to another embodiment, the further lower limit value $v_{min2}$ corresponds to a factor $c_2$ multiplied by the set speed $v_{set}$, i.e. $v_{min2}=v_{set}*c_2$. This factor $c_2$ may for example have the value 0.98, meaning that the further upper limit value $v_{max2}$ is 2% lower than the set speed $v_{set}$.

At step S23, according to an embodiment, the reference speed $v_{ref}$ is determined to a value which corresponds to the set speed $v_{set}$ if said second predicted vehicle speed $v_{pred\_Tnew\_acc}$ is above the upper limit value $v_{max}$ and/or above the further lower limit value $v_{min2}$.

At step S23, according to an embodiment, the reference speed $v_{ref}$ is determined to a value which corresponds to the upper limit value $v_{max}$ if a largest value for the second predicted vehicle speed $v_{pred\_Tnew\_acc}$ is below or equal to the upper limit value $v_{max}$ and if a smallest value for second predicted speed is smaller than or equal to the further lower limit value $v_{min2}$. According to an embodiment of the invention, the reference speed $v_{ref}$ may here also be ramped up towards a value which corresponds to the further upper limit value $V_{max2}$.

For the vehicle to be retarded or accelerated (e.g. reach minimum torque or maximum torque), it is possible, according to an embodiment of the invention, for the at least one reference value, e.g. the reference speed $v_{ref}$, to be imparted with an offset. Minimum torque may than for example be imparted by giving the reference speed $v_{ref}$ a low value below the lower limit value $v_{min}$. For example, the reference speed $v_{ref}$ may be given the value $v_{min}-k_1$, in which $k_1$ is within the range 1-10 km/h. The engine's control unit will then demand drag torque from the engine. In a similar way, maximum torque may be reached by giving the reference speed $v_{ref}$ a high value above the second upper limit value $v_{max}$. For example, the reference speed $v_{ref}$ may be given the value $v_{max}+k_2$, in which $k_2$ is within the range 1-10 km/h.

According to an embodiment of the invention, account is taken of the efficiency of the power train (i.e. the efficiency of the engine, gearbox and final gear) and comfort/drivability when making the first prediction $v_{pred\_Tnew\_ret}$ and second prediction $v_{pred\_Tnew\_acc}$ of the vehicle speed, i.e. in choosing the control strategies to be predicted when the first and second predictions are determined. Comfortable and economical cruise control are achievable by determining in terms of magnitude and/or time the torque T, depending on the engine's efficiency or based on comfort requirements, resulting in different magnitudes for the respective first and second predictions. This embodiment may be implemented on the basis of rules such as that the engine has to have a certain torque at a certain engine speed or that torque resulting in more acceleration than a certain limit value is never allowed.

How various rules may be applied to decide which at least one reference value on which the vehicle is to be regulated was described above. According to embodiments described below, cost functions are instead used for deciding which at least one reference value the vehicle is to be regulated on. FIG. 4 illustrates the calculations based on these cost functions at steps S23 and S33. How the cost functions are used in determining the at least one reference value will therefore be described in detail below in relation to further embodiments of the present invention.

According to an embodiment of the present invention, at least one further first prediction $v_{pred\_Tk+new\_ret}$ and second prediction $v_{pred\_Tk+new\_acc}$ of the vehicle's speed along the horizon are made in each simulation cycle $s_j$. Here a conventional predication of the vehicle's speed $v_{pred\_cc}$ along the horizon is first made according to a conventional cruise control. This is followed by at least one further first prediction $v_{pred\_Tk+new\_ret}$ of the vehicle's speed along the horizon, each of the at least one further first prediction based on a torque which is required to lower the vehicle's speed below the conventionally predicted vehicle speed $v_{pred\_cc}$. In addition, at least one further second prediction of the vehicle's speed along the horizon is made, each of the at least one further second prediction being based on a torque which is required to increase the vehicle's speed above the conventionally predicted vehicle speed $v_{pred\_cc}$, and the torque on which the at least one further first prediction $v_{pred\_Tk+new\_ret}$ and second prediction $v_{pred\_Tk+new\_acc}$ are based depends on said conventionally predicted vehicle speed $v_{pred\_cc}$ in the immediately preceding simulation cycle $s_{j-1}$.

According to this embodiment of the invention, a total of five different predictions of the vehicle's speed are here made, viz. $v_{pred\_cc}$, $v_{pred\_Tnew\_ret}$, $v_{pred\_Tnew\_acc}$, $v_{pred\_Tk+new\_ret}$ and $v_{pred\_Tk+new\_acc}$. Each of these predictions of the vehicle's speed other than the conventional prediction $v_{pred\_cc}$ is based on a torque which is required to increase the vehicle's speed above the first predicted vehicle speed $v_{pred\_cc}$ or on a torque which is required to lower the vehicle's speed below the first predicted vehicle speed $v_{pred\_cc}$, and the torque on which the at least one further first prediction $v_{pred\_Tk+new\_ret}$ and second prediction $v_{pred\_Tk+new\_acc}$ are based depends on said conventionally predicted vehicle speed $v_{pred\_cc}$, in the immediately preceding simulation cycle $s_{j-1}$.

According to an embodiment, other criteria are used for determining another torque T which results in an alternative mode of driving, in order to decide when and with what torque T the at least one further first prediction $v_{pred\_Tk+new\_ret}$ and second prediction $v_{pred\_Tk+new\_acc}$ of the vehicle's speed along the horizon are to be made, e.g. where particular comfort requirements are desired. Making the at least one further first prediction $v_{pred\_Tk+new\_ret}$ and second prediction $v_{pred\_Tk+new\_acc}$ preferably comprises initially one or more simulation steps by using functions of a conventional cruise control, followed by conducting the remaining simulation steps with a different torque T from that for the conventional cruise control, e.g. maximum or minimum torque in a similar way to as described above.

A total of five different predictions of the vehicle's speed, viz. $v_{pred\_cc}$, $v_{pred\_Tnew\_ret}$, $v_{pred\_Tnew\_acc}$, $v_{pred\_Tk+new\_ret}$ and $v_{pred\_Tk+new\_acc}$, with different control strategies are thus made according to this embodiment, for a limited distance of length L ahead of the vehicle, also called the horizon. Each such prediction preferably involves, according to an embodiment of the invention, calculating the vehicle's speed profile v, total energy consumption $E_N$ and journey time $t_N$.

The total energy consumption $E_N$ for a predicted speed during a simulation cycle is calculated by using equation 14. The total time $t_N$ for a predicted speed during the simulation cycle is similarly calculated by equation 13. The prediction of the conventional vehicle speed $v_{pred\_cc}$ gives the total energy consumption designated $E_{pred\_cc}$ and the total journey time designated $t_{pred\_cc}$ and decides which of the other control strategies/modes of driving are to be predicted, in a similar way to as described above.

According to an embodiment, the at least one reference value, which here is the reference speed $v_{ref}$, is determined to a value which represents the set speed $v_{set}$ if not only is said first prediction $v_{pred\_Tnew\_ret}$ of the vehicle speed below the limit value set directly or indirectly by the driver, e.g. the lower limit value $v_{min}$, but also said second prediction $v_{pred\_Tnew\_acc}$ of the vehicle speed is above the upper limit value $v_{max}$. This is illustrated at step S3, in FIG. 4, which the method moves on to if both of the comparisons at steps S22 and S32 produce the answer "YES".

The total time $t_{LA\_Tnew\_acc}$ and the total energy consumption $E_{LA\_Tnew\_acc}$ are calculated during each simulation cycle for the second predicted speed $v_{pred\_Tnew\_acc}$ based on an acceleration. The further second predicted vehicle speed $v_{pred\_Tk+new\_acc}$ is also predicted as described above, and the total time $t_{LA\_Tk+new\_acc}$ and the total energy consumption $E_{LA\_Tk+new\_acc}$ for the further second predicted vehicle speed $v_{pred\_Tk+new\_acc}$ are calculated during a single simulation cycle. The acceleration torque may here be any appropriate high engine torque which results in acceleration of the vehicle, e.g. a working point which has better efficiency and/or results in more comfortable acceleration than the maximum torque would.

The total time $t_{LA\_Tnew\_ret}$ and the total energy consumption $E_{LA\_Tnew\_ret}$ are calculated during each simulation cycle for the first predicted speed $v_{pred\_Tnew\_ret}$ and then represent the total time and the energy consumption for the first predicted speed $v_{pred\_Tnew\_re}$ based on a retardation. In addition, the further first predicted vehicle speed $v_{pred\_Tk+new\_ret}$ is predicted as above, and the total time $t_{LA\_Tk+new\_ret}$ and the total energy consumption $E_{LA\_Tk+new\_ret}$ for the further first predicted vehicle speed $v_{pred\_Tk+new\_ret}$ are also predicted and then represent the total time and the energy consumption for the further first predicted vehicle speed $v_{pred\_Tk+new\_ret}$ based on a retardation, e.g. a minimum torque. The retardation torque may for example be a drag torque but might also be some other low engine torque which results in retardation if for example the working point has better efficiency and/or results in more comfortable retardation than the minimum torque would.

According to an embodiment of the invention, the speed predictions are evaluated by calculating the cost with respect to at least these predicted vehicle speeds. Determining said at least one reference value is therefore based here on at least one evaluation of a cost for at least one from among said first prediction $v_{pred\_Tnew\_ret}$, said second prediction $v_{pred\_Tnew\_acc}$ and a further first prediction $v_{pred\_Tk+new\_ret}$ and a further second prediction $v_{pred\_Tk+new\_acc}$ of the vehicle speed by using at least one cost function $J_{Tnew\_ret}$, $J_{Tnew\_acc}$, $J_{Tk+new\_ret}$, $J_{Tk+new\_acc}$. On the basis of these costs it is possible to identify one of the predictions of vehicle speeds/control strategies as the best one for the particular case, making it possible to choose an appropriate predicted vehicle speed/control strategy.

The calculation unit described above is preferably adapted to performing these calculations. According to an embodiment, the cost functions $J_{Tnew\_ret}$, $J_{Tnew\_acc}$, $J_{Tk+new\_ret}$ and $J_{Tk+new\_acc}$ for said first prediction $v_{pred\_Tnew\_ret}$, said second prediction $v_{pred\_Tnew\_acc}$, said further first prediction $v_{pred\_Tk+new\_ret}$ and said further second prediction $v_{pred\_Tk+new\_acc}$ of the vehicle speed are determined by weighting their respective energy reductions and journey time reductions relative to a conventional prediction of the vehicle's speed $v_{pred\_cc}$ with a weighting parameter $\beta$ according to the cost functions $$J_{Tnew\_ret} = \frac{E_{LA,Tnew\_ret}}{E_{pred\_cc}} + \beta \frac{t_{LA,Tnew\_ret}}{t_{pred\_cc}} \quad \text{(eq. 15)}$$

$$J_{Tk+new\_ret} = \frac{E_{LA,Tk+new\_ret}}{E_{pred\_cc}} + \beta \frac{t_{LA,Tk+new\_ret}}{t_{pred\_cc}} \quad \text{(eq. 16)}$$

$$J_{Tnew\_acc} = \frac{E_{LA,Tnew\_acc}}{E_{pred\_cc}} + \beta \frac{t_{LA,Tnew\_acc}}{t_{pred\_cc}} \quad \text{(eq. 17)}$$

$$J_{Tk+new\_acc} = \frac{E_{LA,Tk+new\_acc}}{E_{pred\_cc}} + \beta \frac{t_{LA,Tk+new\_ac}}{t_{pred\_cc}} \quad \text{(eq. 18)}$$

The cost functions $J_{Tnew\_ret}$, $J_{Tnew\_acc}$, $J_{Tk+new\_ret}$ and $J_{Tk+new\_acc}$ are thus standardised with respect to the vehicle's predicted mode of driving according to the conventional cruise control ($E_{pred\_cc}$ and $t_{pred\_cc}$). The cost estimations are therefore independent of, for example, the vehicle's weight. They are based solely on energy consumption and journey time, and the calculations take no account of the vehicle's fuel consumption. This means that there is no need for any model of the engine's efficiency, thereby simplifying the calculations when evaluating which control strategy is the most advantageous.

The weighting parameter $\beta$ also depends very little on vehicle weight, distance traveled and engine type. The introduction of modes or setting facilities for controlling the vehicle speed is thus simplified. According to an embodiment, the driver or the system may for example choose whether to give priority to reducing fuel consumption or reducing journey time by altering the weighting parameter $\beta$. This function may be presented to the driver in a user interface, e.g. in the vehicle's instrument panel, in the form of the weighting parameter $\beta$ or a parameter which depends on the weighting parameter $\beta$.

According to an embodiment of the invention, the cost functions $J_{Tnew\_ret}$, $J_{Tnew\_acc}$, $J_{Tk+new\_ret}$ and $J_{Tk+new\_acc}$ for said first prediction $v_{pred\_Tnew\_ret}$, said second prediction $v_{pred\_Tnew\_acc}$, said further first prediction $v_{pred\_Tk+new\_ret}$ and said further second prediction $v_{pred\_Tk+new\_acc}$ of the vehicle speed $v_{pred\_Tnew\_ret}$ of the vehicle speed are subjected to a cost function comparison followed by determining said at least one reference value on the basis of said comparison to arrive at lowest cost. In other words, the reference value is set to whichever from among said first prediction, said second prediction, said further first prediction and said further second prediction of the vehicle speed results in least cost. This is done in this embodiment at step S23 for acceleration and at step S33 for retardation (FIG. 4).

According to an embodiment, a penalty is added to at least one of the cost functions $J_{Tnew\_ret}$, $J_{Tk+new\_ret}$, for said first prediction $v_{pred\_Tnew\_ret}$, and said further first prediction $v_{pred\_Tk+new\_ret}$ of the vehicle speed if said first prediction and said further first prediction reach different final speeds.

Similarly, a penalty is added to at least one from among the cost functions $J_{Tnew\_acc}$, $J_{Tk+new\_acc}$, for said second prediction $v_{pred\_Tnew\_acc}$, and said further second prediction $v_{pred\_Tk+new\_acc}$ of the vehicle speed if said second prediction and said further second prediction reach different final speeds.

According to an embodiment, the different control strategies, e.g. said first prediction $v_{pred\_Tnew\_ret}$ and said further first prediction $v_{pred\_Tk+new\_ret}$ of the vehicle speed often do not have the same final speed at the end of the horizon, which according to an embodiment is catered for in the evaluation of the costs of the control strategies. This is illustrated in the diagram, in which said second prediction and said further second prediction are based on an acceleration.

The second predicted vehicle speed $v_{pred\_Tnew\_acc}$ results in a higher final speed $V_{end,Tnew\_acc}$ than the final speed $v_{end,Tk+new\_acc}$ for the further second predicted vehicle speed $v_{pred\_Tk+new\_acc}$.

Figure 5:
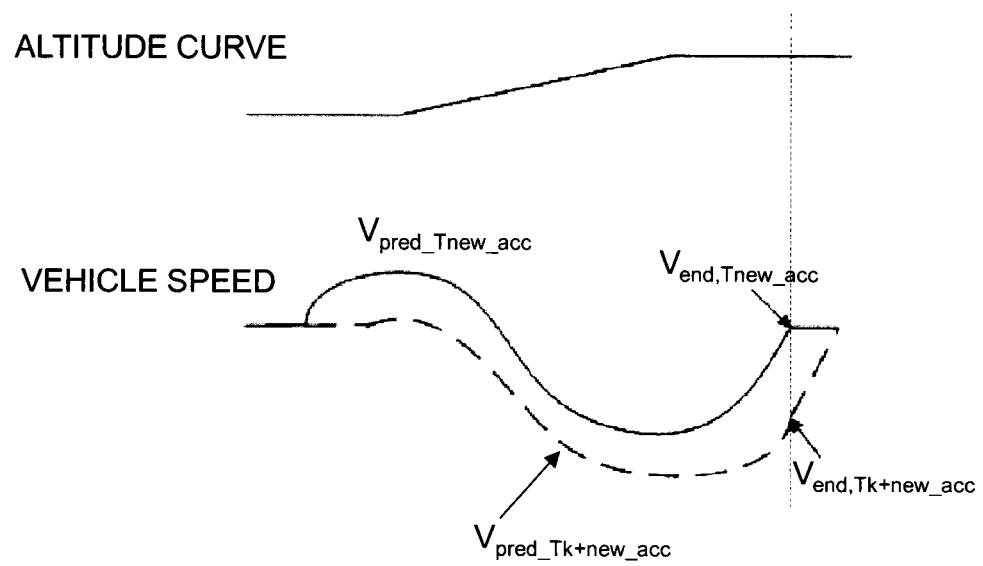
FIG. 5 illustrates the vehicle's predicted speeds according to an embodiment of the invention.

According to the aforesaid embodiments of the invention, a penalty is added to at least one out of the cost functions $J_{Tnew\_acc}$ and $J_{TK+new\_acc}$ if the second predicted vehicle speed $v_{pred\_Tnew\_acc}$ in FIG. 5 results in a higher final speed $v_{end,Tnew\_acc}$ than the final speed $v_{end,Tk+new\_acc}$ for the further second predicted vehicle speed $v_{pred\_Tk+new\_acc}$. Similarly, a penalty would be added to at least one of the cost functions $J_{Tnew\_acc}$ and $J_{TK+new\_acc}$ if they resulted in different final speeds.

The size of the penalty may be calculated on the basis of the energy consumption $E_\gamma$ and journey time $t_\gamma$ which would be required along the horizon to bring the final speed $v_{end,Tk+new\_acc}$ of the further second prediction to the final speed $v_{end,Tnew\_acc}$ for the second prediction $v_{pred\_Tnew\_acc}$ and at the same time cause both predictions to travel equally long distances. We describe below how this is done for the second prediction and the further second prediction. The same also applies to the first prediction $v_{pred\_Tnew\_ret}$ and the further first prediction $v_{pred\_Tk+new\_ret}$ of the vehicle speed but with changes of indices in the equations and the reasoning set out below.

The cost functions will then take the form $$J_{Tnew\_acc} = \frac{E_{LA,Tnew\_acc} + E_{\gamma,Tnew\_acc}}{E_{pred\_cc}} + \beta \frac{t_{LA,Tnew\_acc} + t_{\gamma,Tnew\_acc}}{t_{pred\_cc}} \quad \text{(eq. 19)}$$

$$J_{Tk+new\_acc} = \frac{E_{LA,Tk+new\_acc} + E_{\gamma,Tk+new\_acc}}{E_{pred\_cc}} + \beta \frac{t_{LA,Tk+new\_acc} + t_{\gamma,Tk+new\_acc}}{t_{pred\_cc}} \quad \text{(eq. 20)}$$

Arriving at the energy consumption $E_\gamma$ and journey time $t_\gamma$ involves a number of calculations based on Newton's second law, supposing a constant running resistance in the case where $F_{env}$ is constant, i.e. it is here assumed that the road is level and that the air resistance and rolling resistance do not depend on the vehicle speed:

$$m\dot{v} = (F_{drive} - F_{env}) \quad \text{(eq. 21)}$$

On these assumptions, the vehicle speed becomes a linear function of time.

The journey time for the second further prediction $v_{pred\_Tk+new\_acc}$ to change from $V_{end,Tk+new\_acc}$ to $V_{end,Tnew\_acc}$ becomes $$t_{\gamma,Tk+new\_acc} = (v_{end,Tnew\_acc} - v_{end,Tk+new\_acc}) \frac{m}{F_{drive} - F_{env}}. \quad \text{(eq. 22)}$$

The distance traveled by the vehicle is $$s_\gamma = \frac{F_{drive} - F_{env}}{2m} t^2_{\gamma,Tnew\_acc} + v_{end,Tk+new\_acc} \cdot t_{\gamma,Tk+new\_acc}. \quad \text{(eq. 23)}$$

The energy requirement is $$E_{\gamma,Tk+new\_acc} = F_{driv} \cdot s_\gamma. \quad \text{(eq. 24)}$$

The journey time for the second prediction to cover the same distance $s_\gamma$ with no change in the speed $v_{end,Tnew\_acc}$ is $$t_{\gamma,Tnew\_acc} = \frac{s_\gamma}{v_{end,Tk+new\_acc}}. \quad \text{(eq. 25)}$$

The energy requirement is $$E_{\gamma,Tnew\_acc} = F_{env} \cdot s_\gamma \quad \text{(eq. 26)}$$

If $v_{end,Tk+new\_acc} < v_{end,Tnew\_acc}$ a maximum torque $(F_{drive} = F_{max})$ is used, and if $v_{end,Tk+new\_acc} > v_{end,Tnew\_acc}$ a drag torque $(F_{drive} = 0)$ is used.

According to an embodiment, the standardising values $E_{pred\_cc}$ and $t_{pred\_cc}$ are not updated to obtain values for exactly the same distance traveled as the other predictions. For example, the values may be updated for each simulation cycle. The distance $s_\gamma$ is so short relative to the total distance predicted that the standardisation works well even without taking into account energy and time consumed by conventional cruise controls over the distance $s_\gamma$.

According to an aspect of the invention a computer programme product is proposed which comprises programme instructions for enabling a computer system in a vehicle to perform steps according to the method described when those instructions are run on said computer system. The invention comprises also a computer programme product in which the programme instructions are stored on a medium which can be read by a computer system.

The present invention is not restricted to the embodiments described above. Various alternatives, modifications and equivalents may be used. The aforesaid embodiments therefore do not limit the invention's scope which is defined by the attached claims.

The invention claimed is:

1. A method for determination of at least one reference value for a speed regulator that controls a speed of a vehicle such that said reference value may differ from a value corresponding to the speed indicated by a driver of the vehicle, the method comprising:
   making, automatically by a control unit including an automated processor, a first prediction and a second prediction of a speed of the vehicle along a horizon, said first prediction based on an engine torque which retards the vehicle as compared with the speed regulator in which the reference value equals the speed indicated by the driver, and said second prediction based on an engine torque which accelerates the vehicle as compared with the speed regulator in which the reference value equals the speed indicated by the driver;

comparing each of the first prediction and the second prediction with a lower limit value and/or an upper limit value which delineate, respectively, a lower limit and an upper limit of a range within which the speed of the vehicle is maintained;

determining the at least one reference value based on at least one of the comparisons and the first prediction and the second prediction; and controlling the speed of the vehicle based on the at least one reference value determined.

2. A method according to claim 1, wherein the first prediction and the second prediction are made in parallel.

3. A method according to claim 1, wherein the comparing of the first prediction and the second prediction with the lower limit value and/or the upper limit value are done in parallel.

4. A method according to claim 1, wherein the at least one reference value is any of the following:
reference speed $v_{ref}$,
a reference torque $T_{ref}$,
a reference speed $\omega_{ref}$.

5. A method according to claim 1, wherein a hysteresis is applied to the at least one reference value.

6. A method according to claim 1, further comprising applying a rule to determine the at least one reference value.

7. A method according to claim 6, wherein the rule is that the at least one reference value is the speed indicated by the driver when the first prediction is below the lower limit value and the second prediction is above the upper limit value.

8. A method according to claim 6, wherein the rule is that the at least one reference value is the first predicted vehicle speed when both following conditions are true:
(a) a minimum value for the first predicted speed is equal to or above the lower limit value, and
(b) a maximum value for said first predicted speed is equal to or above a further upper limit value,
wherein the further upper limit value equals the speed indicated by the driver plus a constant $c_1$.

9. A method according to claim 6, wherein the rule is that the at least one reference value is the second predicted vehicle speed when both following conditions are true:
(a) a maximum value for said second predicted speed is equal to or below the upper limit value, and
(b) a minimum value for said second predicted speed is equal to or below a further lower limit value,
wherein the further lower limit value equals the speed indicated by the driver minus a constant $c_2$.

10. A method according to claim 1, further comprising: determining the at least one reference value in each cycle of a plurality of simulation cycles,
wherein a simulation cycle $S_j$ comprises:
predicting a speed $v_{pred\_cc}$ of the vehicle along the horizon according to the speed indicated by the driver; and
making a first prediction of a speed $v_{pred\_Tk+new\_ret}$ of the vehicle along the horizon, the first prediction being based on a torque required to lower the vehicle's speed below $v_{pred\_cc}$,
making a second prediction of a speed $v_{pred\_Tk+new\_acc}$ of the vehicle along the horizon, the second prediction being based on a torque required to increase the vehicle's speed above the $v_{pred\_cc}$, such that the torque on which the first prediction $v_{pred\_Tk+new\_ret}$ and the second prediction $v_{pred\_Tk+new\_acc}$ are based depends on $v$ $v_{pred\_cc}$ in an immediately preceding simulation cycle $s_{j-1}$.

11. A method according to claim 1, further comprising calculating a speed profile v, an energy consumption $E_N$ and a journey time $t_N$ of the vehicle at each prediction of the vehicle speed.

12. A method according to claim 11, wherein the determination of the at least one reference value is based on at least one evaluation of a cost for at least one of the first prediction, the second prediction and a further first prediction $v_{pred\_Tk+new\_ret}$ and a further second prediction $v_{pred\_Tk+new\_acc}$ of the vehicle speed by using at least one cost function $J_{Tnew\_ret}, J_{Tnew\_acc}, J_{Tk+new\_ret}, J_{Tk+new\_acc}$.

13. A method according to claim 12, wherein respective cost functions $J_{Tnew\_ret}, J_{Tnew\_acc}, J_{Tk+new\_ret}$ and $J_{Tk+new\_acc}$ for said first prediction, said second prediction, said further first prediction $v_{pred\_Tk+new\_ret}$ and said further second prediction $v_{pred\_Tk+new\_acc}$ of the vehicle speed are determined by weighting with a weighting parameter P their respective energy reductions and journey time reductions relative to a conventional prediction of the vehicle's speed $v_{pred\_cc}$.

14. A method according to claim 13, wherein the method further comprises: subjecting the cost functions $J_{Tnew\_ret}, J_{Tnew\_acc}, J_{Tk+new\_ret}$ and $J_{Tk+new\_acc}$ for said first prediction, said second prediction, said further first prediction $v_{pred\_Tk+new\_ret}$ and said further second prediction $v_{pred\_Tk+new\_acc}$ of the vehicle speed $v_{pred\_Tnew\_ret}$ of the vehicle speed to a cost function comparison, wherein the determining said at least one reference value is made based on the comparison to arrive at lowest cost.

15. A method according to claim 11, further comprising adding a penalty to at least one from among the cost functions $J_{Tnew\_acc}, J_{Tk+new\_acc}$, for said second prediction, and said further second prediction $v_{pred\_Tk+new\_acc}$ of the vehicle speed, when the second prediction and said further second prediction reach different final speeds.

16. A method according to claim 1, further comprising adding a penalty to at least one of the cost functions $J_{Tnew\_ret}, J_{Tk+new\_ret}$, for said first prediction, and said further first prediction $v_{pred\_Tk+new\_ret}$ of the vehicle speed, when the first prediction and said further first prediction reach different final speeds.

17. A module arranged for determination of at least one reference value for a speed regulator that controls a speed of a vehicle such that said reference value may differ from a value corresponding to the speed indicated by a driver of the vehicle, the module comprising:

a calculation unit configured to make a first prediction and a second prediction of the vehicle speed along a horizon, said first prediction based on an engine torque which retards the vehicle as compared with the speed regulator in which the reference value equals the speed indicated by the driver, and said second prediction based on an engine torque which accelerates the vehicle as compared with the speed regulator in which the reference value equals the speed indicated by the driver;

said module further configured:
to compare the first prediction and the second prediction with a lower limit value and/or an upper limit value which delineate, respectively, a lower threshold and an upper threshold of a range within which the speed of the vehicle is maintained;
to determine at least one reference value based on at least one of the comparisons and said first prediction and second prediction; and to output the at least one reference value determined for controlling the speed of the vehicle.

18. A module according to claim 17, said module being arranged to make said first prediction and second prediction of a vehicle speed along the horizon in parallel.

19. A module according to claim 17, said module being arranged to do said comparisons of said first prediction and a second prediction with a lower limit value $v_{min}$ and/or an upper limit value $v_{max}$ in parallel.

20. A module according to claim 17, in which said at least one reference value is any of the following:
reference speed $v_{ref}$
a reference torque $T_{ref}$
a reference speed $\omega_{ref}$.

21. A module according to claim 17, wherein said module applies a hysteresis to said at least one reference value.

22. A module according to claim 17, wherein said module applies rules to determine which at least one reference value the vehicle is to regulated on.

23. A module according to claim 22, wherein a rule is that the at least one reference value is determined as the set speed $v_{set}$, when said first prediction of the vehicle speed is below the second limit value and said second prediction of the vehicle speed is above the upper limit value.

24. A module according to claim 23, wherein said module determines, as the at least one reference value, said first predicted vehicle speed, when a minimum value for said first predicted speed is equal to or above the lower limit value and if also a maximum value for said first predicted speed is equal to or above a further upper limit value,
wherein the further upper limit value is the set speed plus a constant $c_1$.

25. A module according to claim 23, wherein said module determines, as the at least one reference value, said second predicted vehicle speed, when both following conditions are true:
(a) a maximum value for said second predicted speed is equal to or below the upper limit value, and
(b) a minimum value for said second predicted speed is equal to or below a further lower limit value,
wherein the further lower limit value is a speed indicated by the driver minus a constant $c_2$.

26. A module according to claim 17, wherein said module is configured to determine the at least one reference value in each cycle of a plurality of simulation cycles, wherein in a simulation cycle $s_j$ the module performs:
a conventional prediction of the speed $v_{pred\_cc}$ of the vehicle along the horizon according to a conventional cruise control; and
at least one further first prediction $v_{pred\_Tk+new\_ret}$ of the vehicle's speed along the horizon, each such further first prediction being based on a torque required to lower the speed of the vehicle below the conventionally predicted vehicle speed $v_{pred\_cc}$,
at least one further second prediction of the speed of the vehicle along the horizon is made, each such further second prediction being based on a torque required to increase the vehicle's speed above the conventionally predicted vehicle speed $v_{pred\_cc}$,
where the torque on which the at least one further first prediction $v_{pred\_Tk+new\_ret}$ and second prediction $v_{pred\_Tk+new\_acc}$ are based depends on said conventionally predicted vehicle speed $v_{pred\_cc}$ in an immediately preceding simulation cycle $s_{j-1}$.

27. A module according to claim 17, wherein said module is configured to calculate the speed profile v of the vehicle, energy consumption $E_N$ and journey time $t_N$ during each prediction of the speed of the vehicle.

28. A module according to claim 27, wherein said module is configured to determine said at least one reference value on the basis of at least one evaluation of a cost for at least one from among said first prediction, said second prediction and a further first prediction $v_{pred\_Tk+new\_ret}$ and a further second prediction $v_{pred\_Tk+new\_acc}$ of the vehicle speed by using at least one cost function $J_{Tnew\_ret}$, $J_{Tnew\_acc}$, $J_{Tk+new\_ret}$, $J_{Tk+new\_acc}$.

29. A module according to claim 28, wherein said module is configured to determine the respective the cost functions $J_{Tnew\_ret}$, $J_{Tnew\_acc}$, $J_{Tk+new\_ret}$ and $J_{Tk+new\_acc}$ for said first prediction, said second prediction, said further first prediction $v_{pred\_Tk+new\_ret}$ and said further second prediction $v_{pred\_Tk+new\_acc}$ of the vehicle speed by weighting with a weighting parameter .beta. their respective energy reductions and journey time reductions relative to a conventional prediction of the vehicle's speed $v_{pred\_cc}$.

30. A module according to claim 29, wherein said module is configured to subject the cost functions $J_{Tnew\_ret}$, $J_{Tnew\_acc}$, $J_{Tk+new\_ret}$ and $J_{Tk+new\_acc}$ for said first prediction, said second prediction, said further first prediction $v_{pred\_Tk+new\_ret}$ and said further second prediction $v_{pred\_Tk+new\_acc}$ of the vehicle speed $v_{pred\_Tnew\_ret}$ of the vehicle speed to a cost function comparison,
wherein the determining of said at least one reference value is based on the comparison to arrive at lowest cost.

31. A module according to claim 27, wherein said module is configured to add a penalty to at least one of the cost functions $J_{Tnew\_ret}$, $J_{Tk+new\_ret}$, for said first prediction $v_{pred\_Tnew\_ret}$ and said further first prediction $v_{pred\_Tk+new\_ret}$ of the vehicle speed, when said first prediction and said further first prediction reach different final speeds.

32. A module according to claim 27, wherein said module is configured to add a penalty to at least one from among the cost functions $J_{Tnew\_acc}$, $J_{Tk+new\_acc}$, for said second prediction $v_{pred\_Tnew\_acc}$ and said further second prediction $v_{pred\_Tk+new\_acc}$ of the vehicle speed, when said second prediction and said further second prediction reach different final speeds.

33. A non-transitory computer readable medium product incorporating instructions configured to enable a computer of a vehicle to perform a method of determining at least one reference value for a speed regulator that controls a speed of a vehicle such that said reference value may differ from a value corresponding to the speed indicated by a driver of the vehicle, the method comprising:
making, automatically by a control unit including an automated processor, a first prediction and a second prediction of a speed of the vehicle along a horizon, said first prediction based on an engine torque which retards the vehicle as compared with the speed regulator in which the reference value equals the speed indicated by the driver, and said second prediction based on an engine torque which accelerates the vehicle as compared with the speed regulator in which the reference value equals the speed indicated by the driver;
comparing each of the first prediction and the second prediction with a lower limit value and/or an upper limit value which delineate, respectively, a lower limit and an upper limit of a range within which the speed of the vehicle is maintained;
determining the at least one reference value based on at least one of the comparisons and the first prediction and the second prediction; and controlling the speed of the vehicle based on the at least one reference value determined, when the instructions are run on said computer.

34. A vehicle comprising a module arranged for determination of at least one reference value for a speed regulator that controls a speed of a vehicle such that said reference value may differ from a value corresponding to the speed indicated by a driver of the vehicle, the module comprising:

a calculation unit configured to make a first prediction and a second prediction of the vehicle speed along a horizon, said first prediction based on an engine torque which retards the vehicle as compared with the speed regulator in which the reference value equals the speed indicated by the driver, and said second prediction based on an engine torque which accelerates the vehicle as compared with the speed regulator in which the reference value equals the speed indicated by the driver;

said module further configured:

to compare the first prediction and the second prediction with a lower limit value and/or an upper limit value which delineate, respectively, a lower threshold and an upper threshold of a range within which the speed of the vehicle is maintained;

to determine at least one reference value based on at least one of the comparisons and said first prediction and second prediction; and to output the at least one reference value determined for controlling the speed of the vehicle.

* * * * *